(12) United States Patent
Cobb

(10) Patent No.: US 8,376,551 B2
(45) Date of Patent: Feb. 19, 2013

(54) ILLUMINATION SYSTEM FOR LASER PROJECTION

(75) Inventor: Joshua Monroe Cobb, Victor, NY (US)

(73) Assignee: Corning Incorporated, Corning, NY (US)

( * ) Notice: Subject to any disclaimer, the term of this patent is extended or adjusted under 35 U.S.C. 154(b) by 339 days.

(21) Appl. No.: 12/712,718

(22) Filed: Feb. 25, 2010

(65) Prior Publication Data

US 2011/0205501 A1    Aug. 25, 2011

(51) Int. Cl.
  *G03B 21/00* (2006.01)
  *G03B 21/28* (2006.01)
  *G02B 27/12* (2006.01)
  *G02B 27/14* (2006.01)

(52) U.S. Cl. ............ 353/81; 353/33; 359/638; 359/340

(58) Field of Classification Search ............. 353/30–31, 353/33, 81, 37, 98; 362/231; 359/638, 640, 359/669; 385/36
See application file for complete search history.

(56) References Cited

U.S. PATENT DOCUMENTS

| | | | |
|---|---|---|---|
| 3,922,069 A | 11/1975 | Kishikawa et al. | |
| 4,284,323 A | 8/1981 | Jankowitz | |
| 4,660,932 A | 4/1987 | Eckbreth | |
| 4,806,750 A | 2/1989 | Vincent | |
| 4,870,268 A | 9/1989 | Vincent et al. | |
| 4,913,528 A | 4/1990 | Hasegawa | |
| 5,005,935 A | 4/1991 | Kunikane et al. | |
| 5,541,771 A | 7/1996 | Bohn | |
| 5,920,347 A | 7/1999 | Aoki | |
| 5,999,509 A * | 12/1999 | Sugiura et al. | 369/112.17 |
| 6,407,974 B1 | 6/2002 | Kim et al. | |
| 6,496,453 B2 * | 12/2002 | Asada et al. | 369/44.23 |
| 6,665,063 B2 | 12/2003 | Jamieson et al. | |
| 7,059,726 B2 * | 6/2006 | Engle | 353/81 |
| 7,167,315 B2 | 1/2007 | Watson et al. | |
| 7,633,562 B2 | 12/2009 | Chilla et al. | |
| 2002/0126288 A1 | 9/2002 | Friberg et al. | |
| 2004/0105078 A1 * | 6/2004 | Akiya | 353/33 |
| 2007/0107769 A1 | 5/2007 | Cobb et al. | |
| 2007/0165184 A1 * | 7/2007 | Kasazumi et al. | 352/66 |
| 2010/0033685 A1 | 2/2010 | Seo et al. | |
| 2011/0249197 A1 * | 10/2011 | Sprowl et al. | 348/744 |
| 2011/0249240 A1 * | 10/2011 | Takahashi et al. | 353/33 |

* cited by examiner

*Primary Examiner* — Tony Ko
*Assistant Examiner* — Jori S Reilly-Diakun
(74) *Attorney, Agent, or Firm* — Joseph M. Homa

(57) ABSTRACT

A color combining apparatus has first, second, and third color channels, each color channel having a light source that is energizable to direct light of a corresponding first, second, or third wavelength band, respectively, toward a color combining element. The color combining element is a single piece of a solid, transparent material having at least first and second flat coated surfaces that are noncontiguous. The first coated surface is treated to reflect incident light of the first wavelength band onto an optical axis and to transmit incident light of the second and third wavelength bands. The second coated surface is treated to reflect incident light of the second wavelength band and to transmit incident light of the third wavelength band.

30 Claims, 17 Drawing Sheets

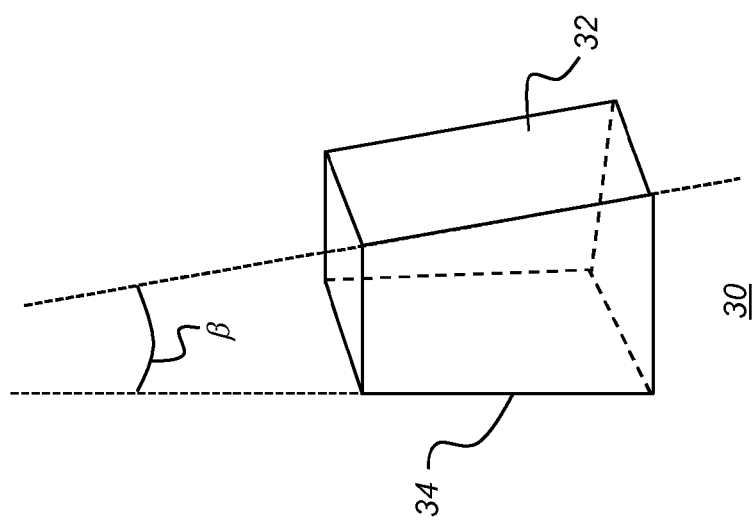

ILLUMINATION SYSTEM FOR LASER PROJECTION

FIELD OF THE INVENTION

This invention generally relates to electronic color imaging and more particularly relates to an apparatus and method for combining light from solid-state light sources of different wavelengths in a projector or other type of imaging apparatus.

BACKGROUND

In an electronic imaging apparatus, such as a portable projector, light from each of a number of different spectral bands, conventionally Red, Green, and Blue (RGB), is combined in order to provide a color image. For large-scale devices, separate modulation and projection optics may be used for each spectral band, converging the component color images to form a composite, multicolor image onto a display screen or other display surface. For more portable projection apparatus, however, a coaxial mixing that combines the colored light from each channel onto a common optical axis is often more desirable. The coaxial mixing arrangement uses the same projection optics for each color channel and allows optical component functions and light modulation to be shared for each color channel where possible, to conserve space and cost.

Earlier electronic imaging apparatus employed lamps and other polychromatic light sources to provide the colored light in each color channel. A number of different types of light-mixing systems were developed to support the light combining function for these earlier systems, including complex prism arrangements adapted from color television camera optics, for example. With the advent of solid-state light sources, such as Light Emitting Diodes (LEDs) and lasers, it became possible to reduce some of the size and cost of color mixing components, as well as improving color gamut, optical efficiency, and overall performance of the imaging device. For color combination, various arrangements of composite prisms and dichroic coatings were developed for use in projectors and similar imaging apparatus. Among the more familiar solutions used with earlier electronic imaging systems are X-cubes or X-prisms, as shown in FIG. 1, and related dichroic optical elements, and Philips prisms. Non-prism solutions include sets of angled dichroic plates, such as those as proposed in U.S. Pat. No. 6,676,260 (Cobb et al.) entitled "Projection Apparatus Using Spatial Light Modulator with Relay Lens and Dichroic Combiner."

Referring to FIG. 1A, an X-cube 10 is a composite prism, formed from four separate prism elements 10a, 10b, 10c, and 10d, as shown in inset E1, that are coated and then glued together to form a single color combiner component. The X-cube combines light from three solid-state light sources 14r, 14g, and 14b, such as laser diodes, emitting red, green, and blue light respectively. As assembled, X-cube 10 has two inner crossed dichroic interfaces 12a and 12b that are treated to selectively reflect and transmit different wavelengths. Dichroic interface 12a reflects blue wavelengths and transmits green and red wavelengths. Dichroic interface 12b, contiguous to dichroic interface 12a so that the two interfaces intersect along a line through the center of the X-cube, reflects red wavelengths and transmits green and blue wavelengths. The line of intersection of the dichroic surfaces is orthogonal to the plane of the drawing as X-cube 10 is represented in FIG. 1A. The colors are combined onto an optical axis OA, shown with separate color paths for clarity in FIG. 1, but coaxial in practice.

The Philips prism 70, shown in FIG. 1B, is a more complex composite prism that is used for combining colors. Philips prism 70 is formed from three separate prisms, prism elements 70a, 70b, and 70c, and includes an air gap 72. An arrangement of dichroic surfaces at oblique angles directs light from solid-state light sources 14r, 14g, and 14b onto optical axis OA.

Dichroic surfaces are formed from stacked layers of ultrathin coatings of various dielectric materials and can be formulated to provide selective reflection and transmission for light of various wavelengths. In the X-cube and Philips prism devices, and other related spectral combiners or separators, various types of dichroic coatings provide the color-selective mechanism that allows light to be spectrally re-combined or separated in a highly controlled manner.

Small, hand-held projectors and various types of embedded or accessory projectors typically use an arrangement of dichroic surfaces for mixing red, green, and blue laser light onto a single optical axis. These devices then rapidly scan the resulting light onto a display surface. To minimize battery usage and heat generation, these devices form each pixel by directly modulating each of the lasers, thereby producing only the light that is used to form the image itself. These projectors form an image by generating successive scanned lines of pixels that are then directed to the display surface.

While hand-held projection devices achieve good results using conventional color combination techniques, however, a number of problems remain. One problem with conventional color combination using dichroic surfaces relates to incident angles. Dichroic coatings reflect and transmit light as a function of incident angle and wavelength. As the incident angle varies, the wavelength of light that is transmitted or reflected also changes. For light that is incident at low angles, that is, at angles close to normal, this variation in response over a small range of angles, relative to wavelength, can be very low or negligible. For light incident at larger angles, however, variation in response over a range of angles can be pronounced, compromising dichroic coating performance. These coatings work best at small incident angles, relative to a normal, and it can be expensive and difficult to design and fabricate a dichroic coating that gives uniform results with incident light at larger angles or over a wide range of angles. Where a dichroic coating must accept light over a large range of angles, perceptible color non-uniformities can easily result.

Other drawbacks of existing color combiners relate to the number of surfaces upon which the light is incident, whether it reflects from or transmits through the surface. Each additional surface represents some efficiency loss and reduced brightness. In addition, each interaction of the light reflecting from or transmitting through a dichroic surface causes some loss, due to imperfect dichroic performance. Due to some amount of light leakage, contrast is also compromised each time the light is incident on a surface, whether or not the surface is coated. With the arrangement of X-cube 10 in FIG. 1A, for example, none of the light beams is incident on fewer than three surfaces. With the arrangement of Philips prism 70 in FIG. 1B, none of the light beams is incident on fewer than four surfaces.

Another consideration relates to reflection and transmission of polarized light. As incident angles for light on the dichroic surface become larger, differences in polarization handling for reflected light become increasingly more pronounced. Moreover, with incident polarized light from multiple laser sources, unique polarization characteristics of the laser diodes themselves must be taken into account. One or more phase retarders can be added in various color channels, but add cost and complexity. The task of designing and fabricating dichroic coatings that allow combination of laser light of different wavelengths but the same polarization presents a considerable and costly challenge.

A further problem relates to dimensional characteristics of the laser beams themselves. The solid state laser beam, considered in cross-section, is typically anamorphic in shape, more elliptical rather than circular, with distortion relative to its orthogonal axes. As a further complication, the amount of anamorphic distortion of the beam varies from one color to the next, making it difficult to form a uniformly sized pixel from three component colors and degrading color quality.

Cost is another concern. As FIGS. 1A and 1B show, conventional solutions for color mixing are characterized by complex arrangements of dichroic surfaces and associated prism elements. A number of fabrication and precision assembly operations are required for their implementation. In conventional manufacture, two or more separate prism elements are formed, then dichroic coatings are applied to one or more outer surfaces. Once coatings are formed, the two or more prisms are then glued together, or are otherwise mounted together in a precise geometric arrangement. As a result of this assembly, one or more dichroic coatings are typically inside the color combiner, surrounded by glass or other transparent material that forms the separate prism elements. Because of coatings tolerances, slight misalignment or angular inaccuracy in prism positioning, unwanted air gaps or imperfections, and other factors, color mixing performance can be compromised.

There is, then, a need for a color mixing solution for solid-state light sources that reduces cost over conventional approaches and offers a reduced number of incident surfaces, reduced incident angles, improved polarization response, and improved beam-shaping.

SUMMARY

The present invention provides a color combiner that uses a single piece of transparent material with two optical surfaces to combine light from two or three solid-state light sources onto a common optical axis.

The present invention provides a color combining apparatus comprising:

first, second, and third color channels, each color channel having a light source that is energizable to direct light of a corresponding first, second, or third wavelength band, respectively, toward a color combining element;

wherein the color combining element is a single piece of a solid, transparent material having at least first and second flat coated surfaces that are noncontiguous;

wherein the first coated surface is treated to reflect incident light of the first wavelength band onto an optical axis and to transmit incident light of the second and third wavelength bands; and wherein the second coated surface is treated to reflect incident light of the second wavelength band and to transmit incident light of the third wavelength band.

It is a feature of the present invention that it employs a single piece of a solid optical material, having appropriate coatings on two external surfaces, to perform color combination. Light is incident only on the first and second coated surfaces of the color combining element; there is no light incidence on other surfaces.

It is an advantage of the present invention that it allows color combination onto a single optical axis from three color sources with low incident angles on dichroic surfaces.

It is a further advantage of the present invention that it allows combination of three colors having the same orientation of polarization transmission axes.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 3B is a perspective view showing a color combiner element with oblique coated surfaces according to an embodiment of the present invention;

DETAILED DESCRIPTION

Figure 1A:
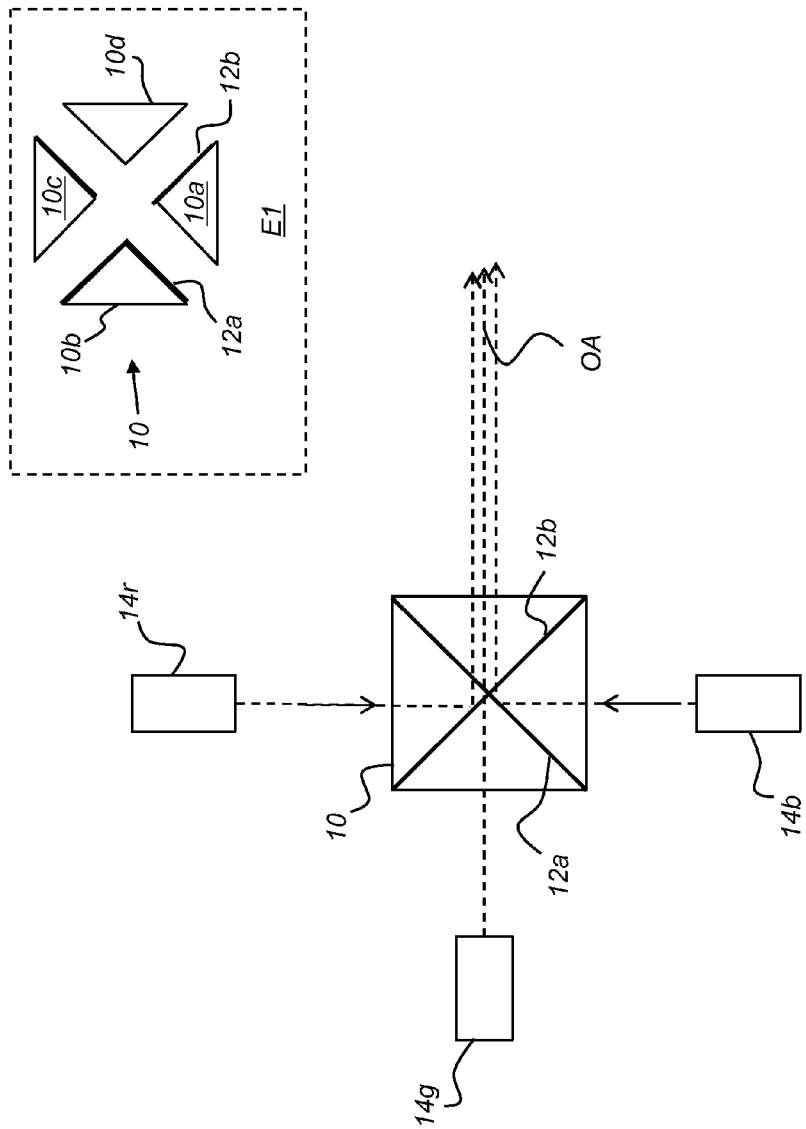
FIG. 1A is a schematic diagram showing the operation of dichroic interfaces within an X-prism used as a color combiner.
Figure 1B:
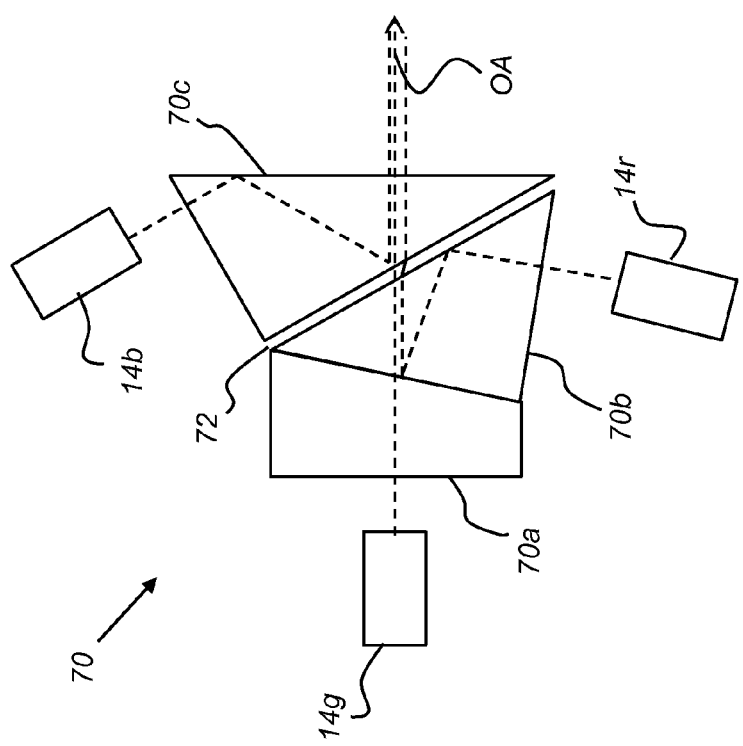
FIG. 1B is a schematic diagram showing the operation of dichroic interfaces within a Philips prism used as a color combiner

It is to be understood that elements not specifically shown or described may take various forms well known to those skilled in the art. For example, conventional prism elements and other optical components are formed from a block of suitable glass substrate, a transparent plastic, or other generally transparent solid material that has the desired index of refraction and other optical characteristics needed in an application. Dichroic coatings formulations and their design and customization are well known to those skilled in the coatings art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships, function, or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted.

Where they are used, the terms "first", "second", and so on, do not necessarily denote any ordinal or priority relation, but may be simply used to more clearly distinguish one element from another. The term "contiguous" has its conventional meaning as touching or sharing one or more boundaries. Two surfaces are non-contiguous where they do not come into contact with each other.

Light is considered to be incident on a surface when it is either reflected from that surface or when it transits, or passes through, the surface.

The term "oblique", as used in the present disclosure, describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, parallel beams are parallel to within +/−2 degrees.

The terms "color" and "wavelength band" are generally synonymous as used in the context of the present disclosure. For example, a laser or other solid-state light source is referred to by its general color, such as red, rather than by its peak output wavelength (such as 635 nm) or its wavelength band (such as 630-640 nm). In the context of the present disclosure, different wavelength bands are considered to be essentially non-overlapping.

The term "direct laser modulation" applies to embodiments of imaging apparatus that form each pixel of an image as a combination of laser light signals, so that the image-forming lasers are rapidly switched on and off and their relative output power controlled for each individual pixel of an image. This form of light modulation is used in conventional types of hand-held projectors, for example, and is advantaged for low power consumption, since only the light that is needed for any particular pixel needs to be generated. Alternative methods for image forming include methods that direct light to a spatial light modulator, such as a digital micromirror array, a liquid crystal device (LCD) such as a Liquid Crystal on Silicon (LCoS) device, or a linear array of electromechanical grating devices used with a scanner. Embodiments of the color combining apparatus of the present invention can be used to support image forming methods of the direct laser modulation type, in which a scanner is actuable to serve as a light modulator component, or those that use a spatial light modulator that is actuable to form composite color images using light of sequential colors, such as red, green, and blue.

The term "prism" or "prism element" is used herein as it is understood in optics, to refer to a transparent optical element that is generally in the form of an n-sided polyhedron with flat surfaces upon which light is incident and that is formed from a transparent, solid material that refracts light. It is understood that, in terms of shape and surface outline, the optical understanding of what constitutes a prism is less restrictive than the formal geometric definition of a prism. A composite prism, such as the X-prism and Philips prism previously described, is an assembled prism formed from two or more prism elements, each separately fabricated and coated, then glued together or otherwise arranged or mounted to provide a color combining function.

In order to better understand how the color combining arrangement of the present invention operates, it is first useful to review conventional color combiner operation for a hand-held projector that uses direct laser modulation, as taught, for example, in U.S. Pat. No. 7,167,315 entitled "Apparatus and Method for Combining Multiple Electromagnetic Beams Into a Composite Beam" to Watson et al. and as shown in the schematic diagram of FIG. 2. A color combiner 20 is a composite prism, formed from prism elements 20a, 20b, and 20c that are separately fabricated and treated, then bonded together using an optical adhesive. Color combiner 20 has two internal, planar dichroic interfaces 22a and 22b that are on parallel planes. Dichroic interface 22a reflects blue wavelengths and transmits green wavelengths. Dichroic interface 22b reflects red wavelengths and transmits green and blue wavelengths. A collimating lens 64 is typically provided in each color channel. The colors are combined onto optical axis OA, again shown with separate color paths for clarity in FIG. 2, but coaxial in practice.

Figure 2:
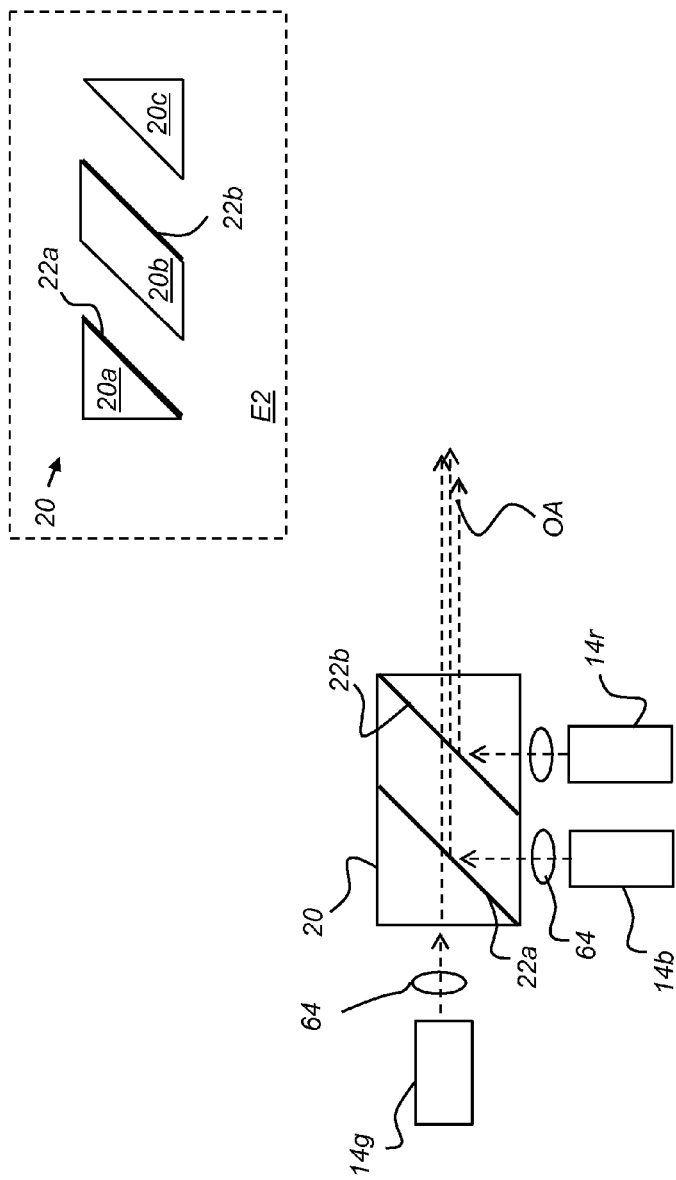
FIG. 2 is a schematic diagram that shows the operation of a color combiner for a conventional pico-projector apparatus.

Among problems with the conventional approach shown in FIG. 2 are relatively large angles of incidence for light from solid-state light sources 14r, 14g, and 14b. Light from light source 14r is incident on one dichroic interface 22b at 45 degrees. Light from light source 14b is incident on dichroic interface 22a at 45 degrees and is then incident on dichroic interface 22b at 45 degrees. Light from light source 14g is also incident on both dichroic interfaces 22a and 22b at 45 degrees. With incident light at a range about these angles, there is some loss of efficiency at each interface. In addition, anti-reflection (AR) coatings must be provided on the otherwise uncoated surfaces that receive incident light, adding cost and complexity to color combiner 20 fabrication.

Another problem with the use of color combiner 20 in FIG. 2 relates to the number of surfaces upon which the reflected and transiting light is incident. Light from light source 14r is incident on three surfaces. Light beams from light sources 14b and 14g are incident on four surfaces. As noted previously, there is some loss of efficiency at each incident surface, whether the surface is coated or non-coated. Further performance problems with this conventional approach relate to polarization and to the generally anamorphic beam shape for laser sources, as described subsequently.

Yet another problem with the conventional solution for color combiner 20 shown in FIG. 2 relates to fabrication. Manufacture of this device requires both dichroic coating processing and an assembly procedure. Inset E2 shows how color combiner 20 is fabricated from prism elements 20a,

20b, and 20c that are glued together to provide dichroic interfaces 22a and 22b embedded within the composite prism structure.

Embodiments of the present invention provide a one-piece color combining element that combines light from multiple lasers or other solid-state light sources for forming a color image. Referring to the perspective view of FIG. 3A, there is shown a color combining element 30 that is formed from a single, monolithic piece of a solid transparent material, such as a block of glass or plastic, and has two external, planar coated dichroic surfaces 32 and 34 that are non-contiguous with respect to each other. In the embodiment of color combining element 30 in FIG. 3A, the flat coated dichroic surfaces 32 and 34 lie in parallel planes. In the alternate embodiment of color combining element 30 FIG. 3B, the flat coated dichroic surfaces 32 and 34 are on non-parallel planes, obliquely disposed with respect to each other at a wedge angle β. Unlike conventional color combiners, color combining element 30 is formed using a single monolithic transparent piece or block of material with two external dichroic surfaces 32 and 34 and no encased, internal dichroic surfaces. Because there is no transit of incident light from the light sources directed to uncoated surfaces, the uncoated surfaces can have any suitable shape or form and could be ground glass or clear, for example. The cross-sectional shape taken orthogonal to the optical axis for color combining element 30, such as a cross-section taken in parallel to either coated surface 32 or 34, could be rectangular, cylindrical, hexagonal, or other suitable shape. Because of its simple arrangement, no special mounting assembly or gluing is required once the coatings are applied.

Figure 4:
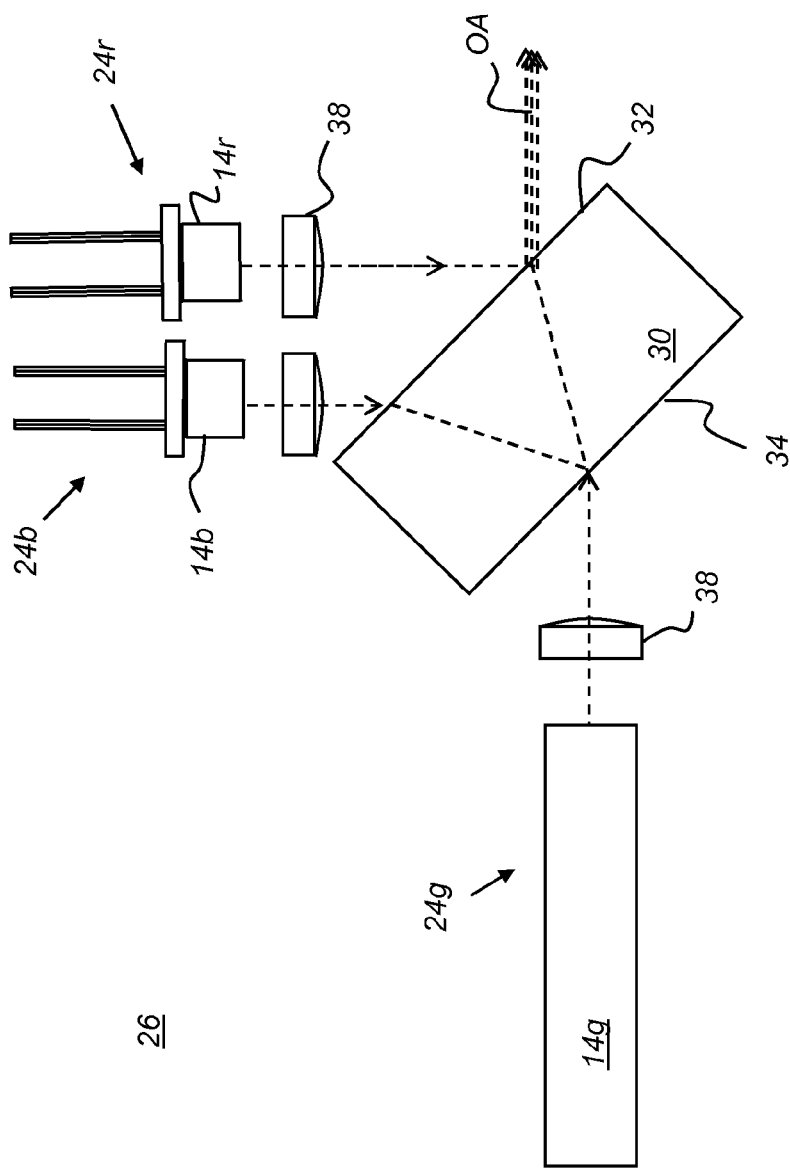
FIG. 4 is a schematic diagram that shows a color combining apparatus according to an embodiment of the present invention.

The schematic block diagram of FIG. 4 shows color combining element 30 used as part of a color combining apparatus 26 in one embodiment of the present invention. In this embodiment, color combining element 30 has parallel coated surfaces 32 and 34. Three solid-state light sources 14r, 14g, and 14b are directed toward color combining element 30. Each light source is energizable to emit a light beam of a corresponding wavelength band, shown here for red, green, and blue light.

Figure 5:
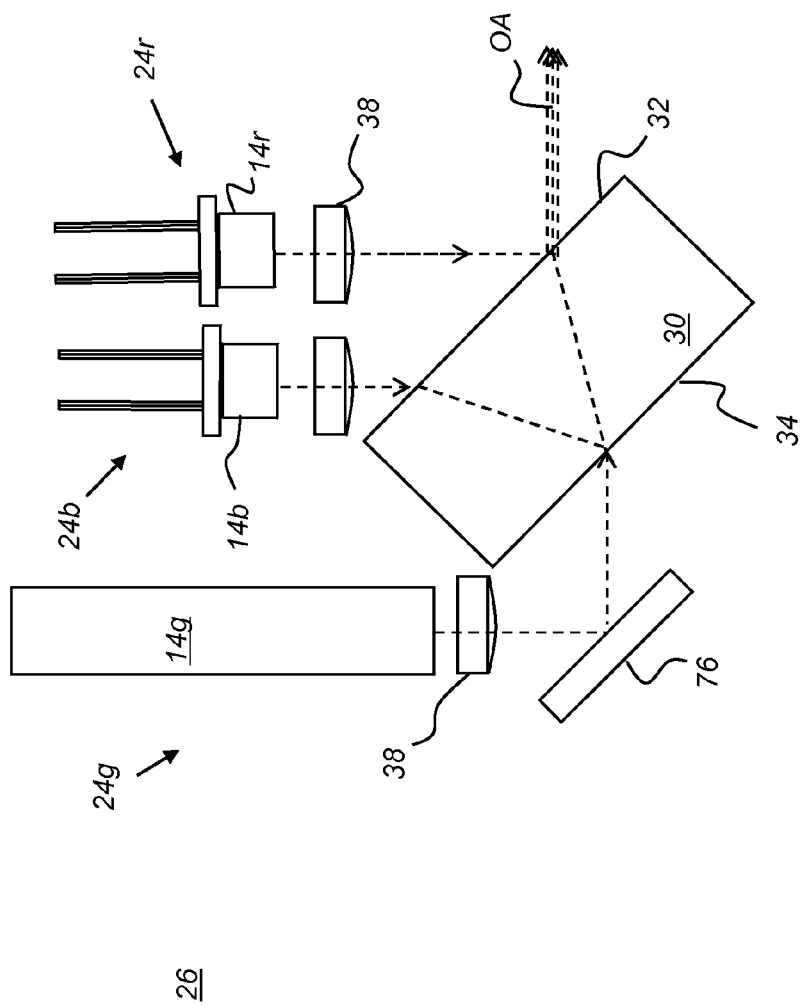
FIG. 5 is a schematic diagram that shows a color combining apparatus according to an alternate embodiment of the present invention.
Figure 6:
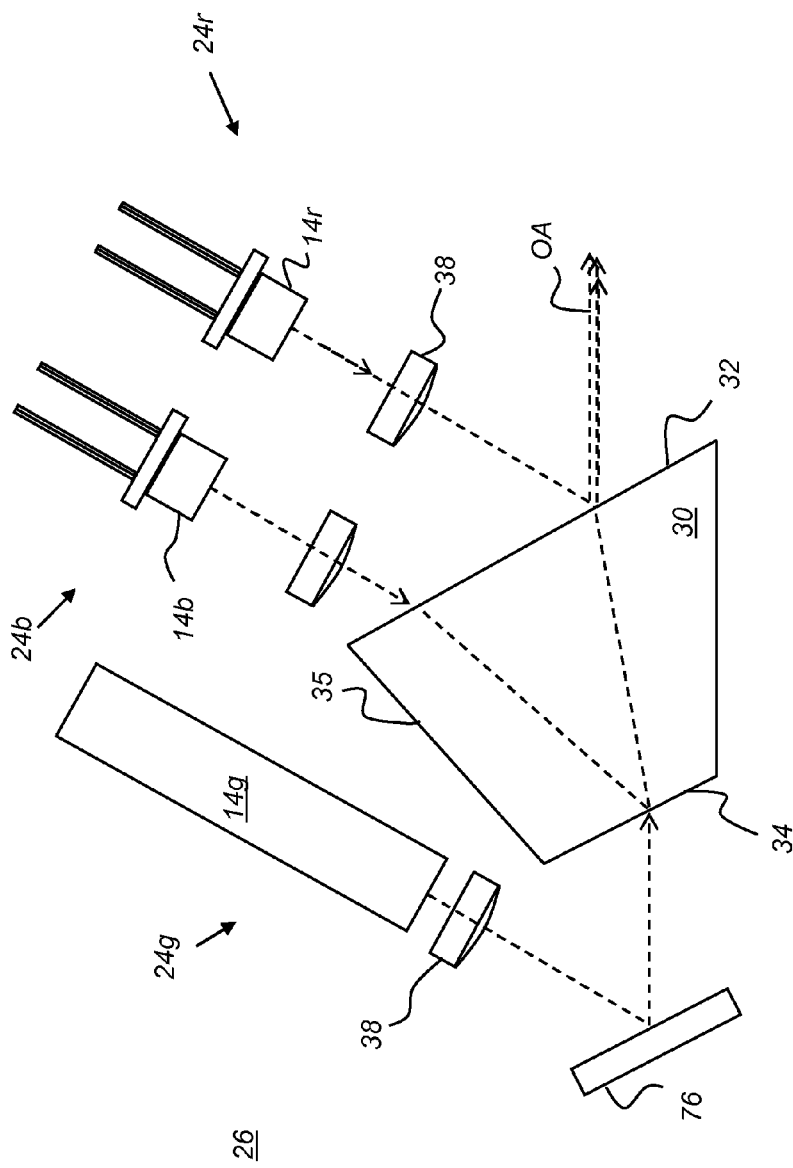
FIG. 6 is a schematic diagram that shows a color combining apparatus according to another alternate embodiment of the present invention.

The schematic block diagram of FIG. 5 shows an alternate embodiment of color combining apparatus 26 in which color combining element 30 with parallel coated surfaces 32 and 34 is used. A mirror 76 or other type of reflective surface is disposed to redirect the beam from light source 14g toward color combining element 30. This embodiment shows the reflective surface of mirror 76 parallel with coated surfaces 34 and 32 of color combining element 30. This arrangement enables parallel arrangement of light beams originating from light sources 14r, 14g, and 14b, which can be useful for packaging of the light-emitting devices. The embodiment shown schematically in FIG. 6 is similarly advantaged, enabling parallel arrangement of light sources 14r, 14g, and 14b, again using mirror 76 in the path of the green beam. This can be advantageous where diode lasers are used, such as for hand-held micro-projector devices, for example. The green laser that serves as light source 14g for such applications may have an extended length when compared with red and blue lasers, as is the case with green laser devices such as those available from Corning Incorporated. Another advantage of the FIG. 6 embodiment relates to low angles of incidence for each of the light beams. There are also advantages in simplified alignment with the FIG. 6 embodiment, since the three light beams begin along parallel paths. Uncoated top surface 35 can have any suitable shape. In the embodiment of FIG. 6, for example, surface 35 is at an angle that allows favorable positioning of light source 14g.

Figure 3A:
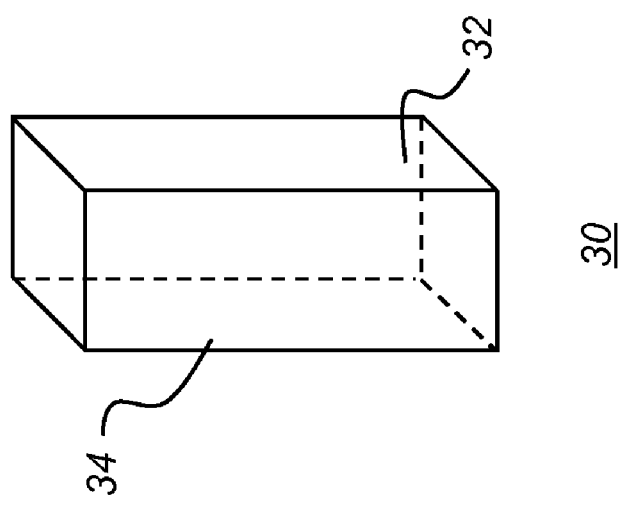
FIG. 3A is a perspective view showing a color combiner element with parallel coated surfaces according to an embodiment of the present invention.

When formed with non-parallel coated surfaces, as shown in FIG. 3B, color combining element 30 can offer favorable incident angles for combining light from multiple laser sources. Referring to the schematic diagram of FIG. 7, color combining element 30 is shown in operation as part of a color combining apparatus 26, with solid-state light sources 14r, 14g, and 14b, each light source energizable to emit light of a corresponding wavelength band, here red, green, and blue, respectively. By way of example, and applicable to FIGS. 4-6 and applicable when using color combining element 30 in both FIG. 3A and FIG. 3B embodiments, FIGS. 8, 9, and 10 show the light path for each wavelength band provided from solid-state light sources 14r, 14b, and 14g, within each color channel 24r, 24b, and 24g, respectively.

Figure 8:
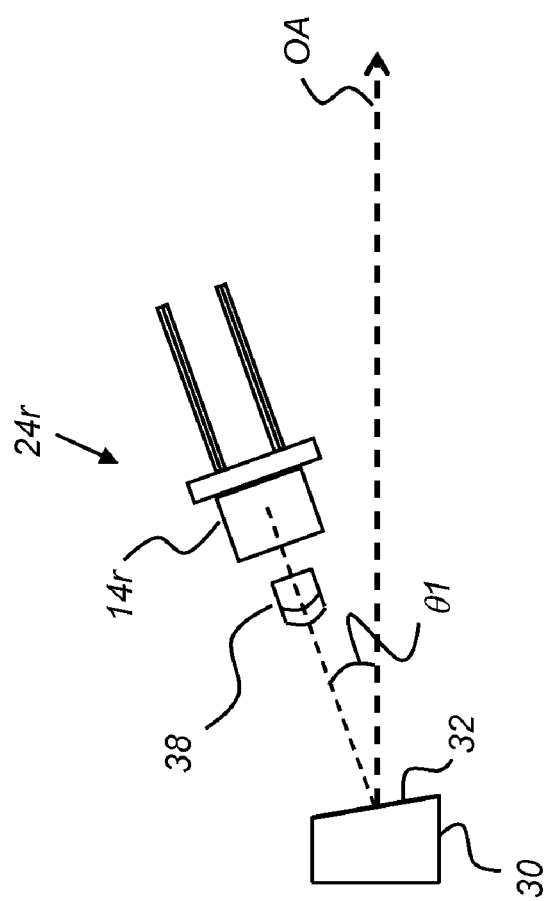
FIG. 8 is a schematic diagram showing the path of light in the red color channel for the embodiment of FIG. 4.

In color channel 24r, shown in FIG. 8, light from red solid-state light source 14r is directed toward color combining element 30 through light-conditioning optics 38, typically a lens and any other needed optics for beam collection and shaping. Dichroic surface 32 reflects the red light, re-directing the light onto the optical axis OA. For color channel 24r, there is only one surface of color combining element 30 on which the light beam is incident.

Figure 9:
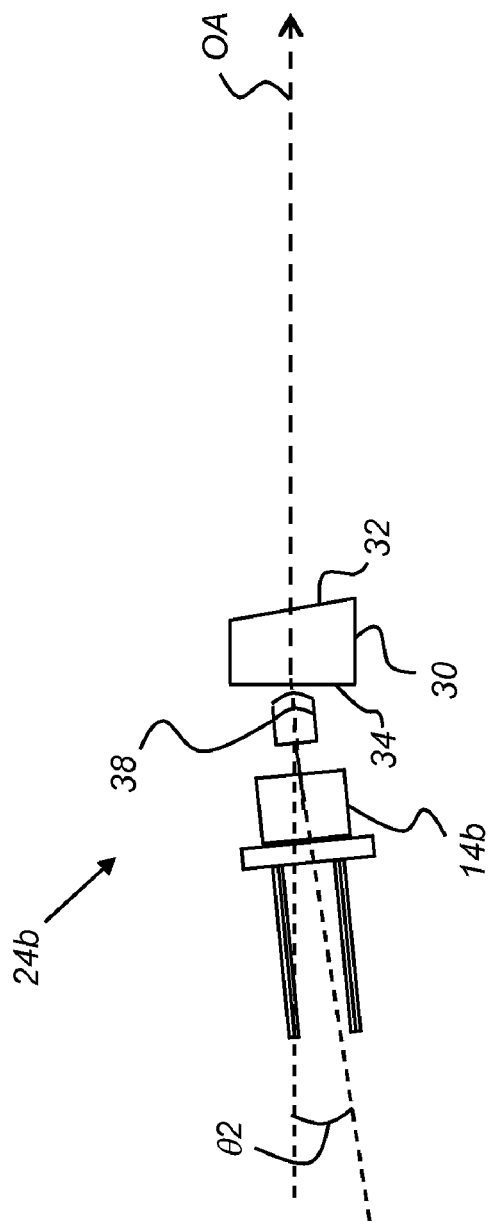
FIG. 9 is a schematic diagram showing the path of light in the blue color channel for the embodiment of FIG. 4.

In color channel 24b, shown in FIG. 9, light from blue solid-state light source 14b is directed toward color combining element 30 through light-conditioning optics 38. Dichroic surface 34 transmits the blue light, which is refracted onto the optical axis OA as it travels through the prism material of color combining element 30. Dichroic surface 32 transmits the redirected blue light. For color channel 24b, there are only two surfaces of color combining element 30 on which the light beam is incident, once on each of surfaces 32 and 34.

Figure 10:
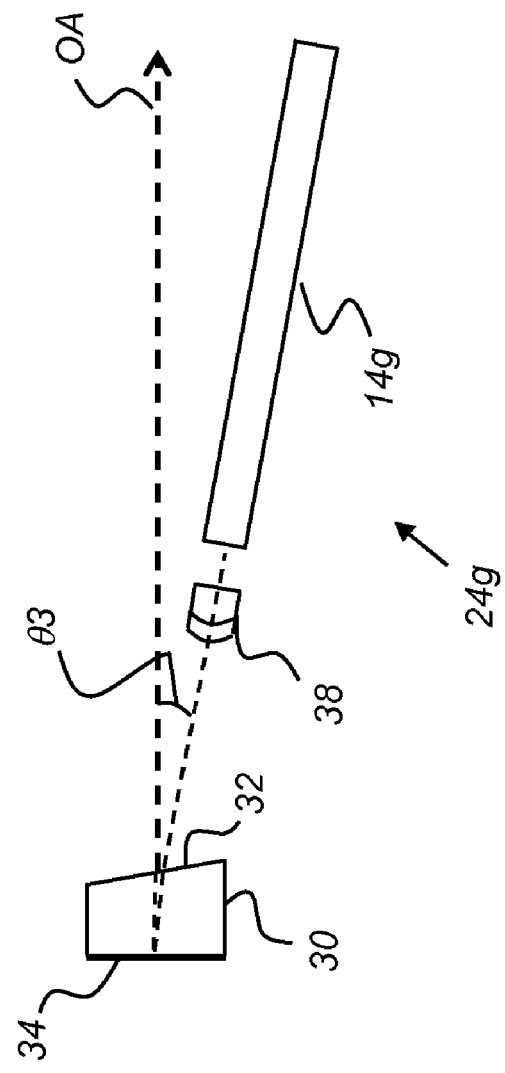
FIG. 10 is a schematic diagram showing the path of light in the green color channel for the embodiment of FIG. 4.

In color channel 24g, shown in FIG. 10, light from green solid-state light source 14g is directed toward color combining element 30 through light-conditioning optics 38. Dichroic surface 32 transmits the green light, which is refracted as it travels through the prism material of color combining element 30. Dichroic surface 34 reflects the redirected green light back through dichroic surface 32 and onto the optical axis OA. For color channel 24g, the green light beam is incident on both surfaces 32 and 34 as shown; incident once on coated surface 34 and incident twice on coated surface 32. Thus, in the light path for green, there are a total of three surfaces that the light beam strikes or is incident upon. On dichroic surface 32, the incoming and outgoing beams are centered at two different, spaced-apart locations.

One advantage with color combining element 30, as shown in embodiments of FIGS. 7-10, relates to the relatively low incident angles of light at any dichroic surface 32 or 34. Incident angles for reflected light are at or below the wedge angle β (FIG. 3B) of the prism body of color combining element 30 in this embodiment. Incident angle θ1 in FIG. 8, for example, is less than 10 degrees. Incident angle θ2 in FIG. 9 is approximately 5 degrees. Incident angle θ3 at the transmitting dichroic surface 32 in FIG. 10 is less than about 20 degrees; at the reflecting dichroic surface 34, this angle is less than 10 degrees, due to refraction within the body of color combining element 30.

By comparison with the conventional color combiner approach shown in FIG. 2, it can be seen that using color combining element 30 not only takes advantage of simpler, single-prism construction, but can also provide very favorable incident angles for both reflected and transmitted light at each dichroic interface. Optical axis OA is oblique with respect to coated dichroic surfaces 32 and 34.

Figure 11:
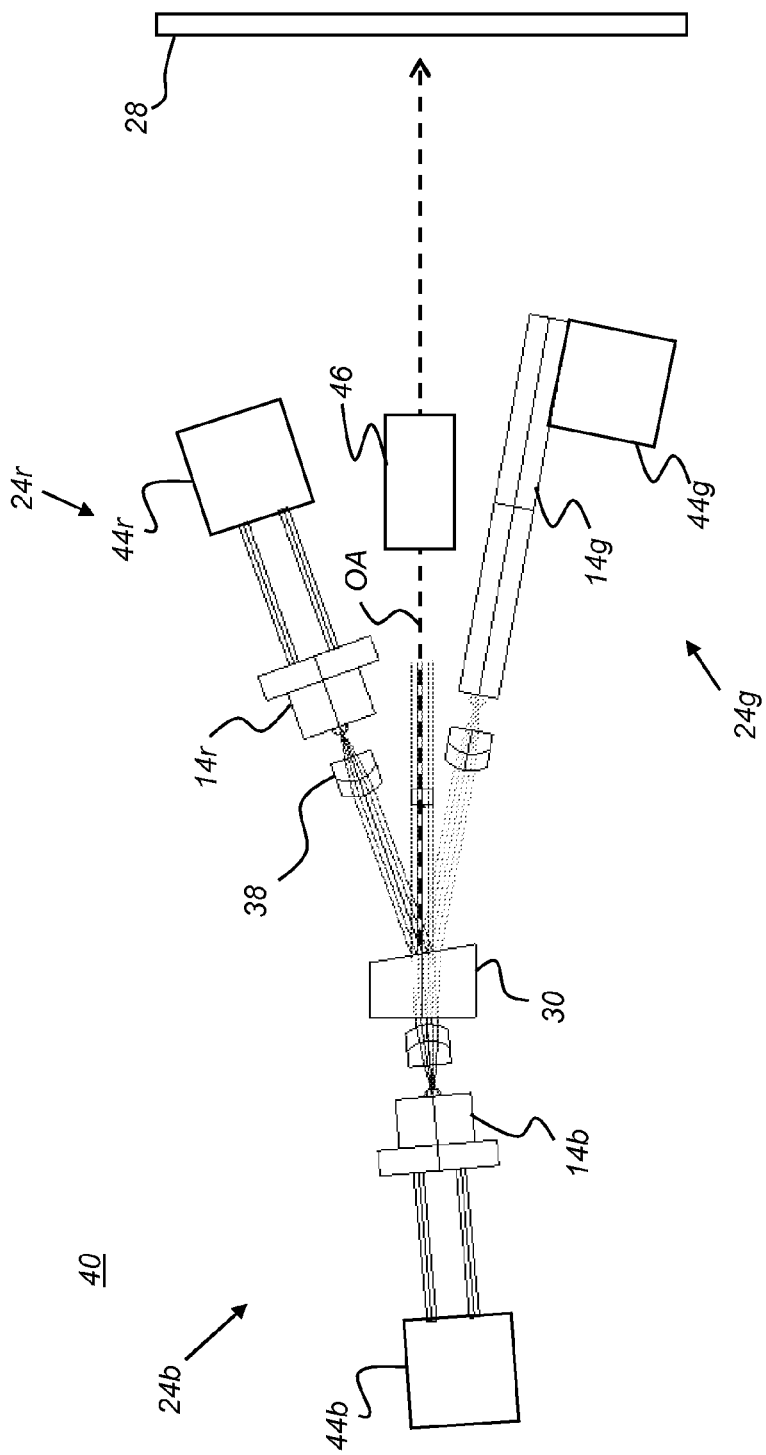
FIG. 11 is a schematic diagram that shows an imaging apparatus using direct laser modulation according to one embodiment.

Referring to the schematic diagram of FIG. 11, there is shown an imaging apparatus 40, such as a hand-held projector, using color combining element 30 in one embodiment of the present invention using direct laser modulation. The configuration of color combining element 30 shown in FIG. 3B is used in FIGS. 11 through 13; it should be noted that the alternate arrangement of color combining element of FIG. 3A could also be used, with the necessary changes to light source 14r, 14g, and 14b orientation and positioning. In the FIG. 11 arrangement, a scanner 46 is used as a light modulator component, actuable to form successive lines of pixels and direct the light toward a display surface 28. Each pixel is written individually and is formed as a combination of primary component red, green, and blue color light. To provide this high-speed pixel generation, each solid-state light source 14r, 14g, and 14b in its respective color channel 24r, 24g, and 24b has a corresponding laser driver 44r, 44g, and 44b, respectively, that operates synchronously with scanner 46. An exemplary high-speed pixel generation and scanning timing pattern is used, for example, in the Pico Projector Display from Microvision Inc., Redmond, Wash., USA, for example.

Figure 12:
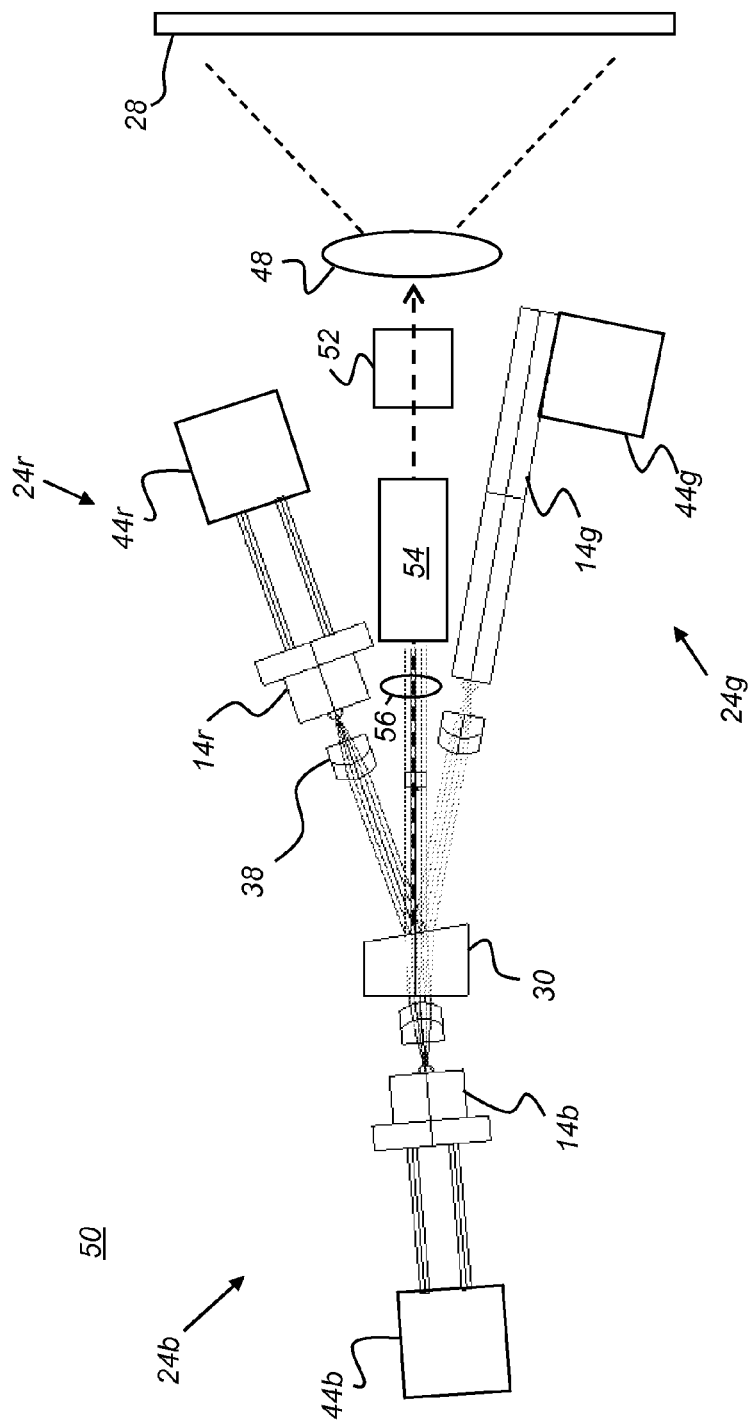
FIG. 12 is a schematic diagram that shows an imaging apparatus using a spatial light modulator with color-sequential imaging.

An alternative projection apparatus is shown schematically in FIG. 12. An imaging apparatus 50 forms images for projection using a spatial light modulator 52, such as a digital micromirror array or other micro-electro-mechanical imaging array device that, when actuated, modulates light using reflection or diffraction, including various types of electro-mechanical grating light modulators, or a polarization modulating device such as a liquid crystal device. A light integrator element 54, such as a fly's-eye integrator, an integrator bar, or other suitable type of light homogenizer, is used to provide a uniform beam of light for modulation. A lens 56 directs light from along the optical axis, one color at a time, to light integrator element 54 for forming an image in a color-sequential arrangement. Here, the function of color combining element 30 is to direct each solid-state light source, one at a time, to spatial light modulator 52 through integrator element 54. A projection lens 48 is used to direct light toward display surface 28.

As noted previously, component packaging can be a challenge where green solid-state light source 14g is a laser. In green diode lasers, additional second-harmonic generating components, used for frequency doubling, increase the size of the green laser component, as represented in FIGS. 4-13. The alternate embodiments shown in FIGS. 12 and 13 can help to reduce the relative area or "footprint" required for illumination and color combination.

Figure 13:
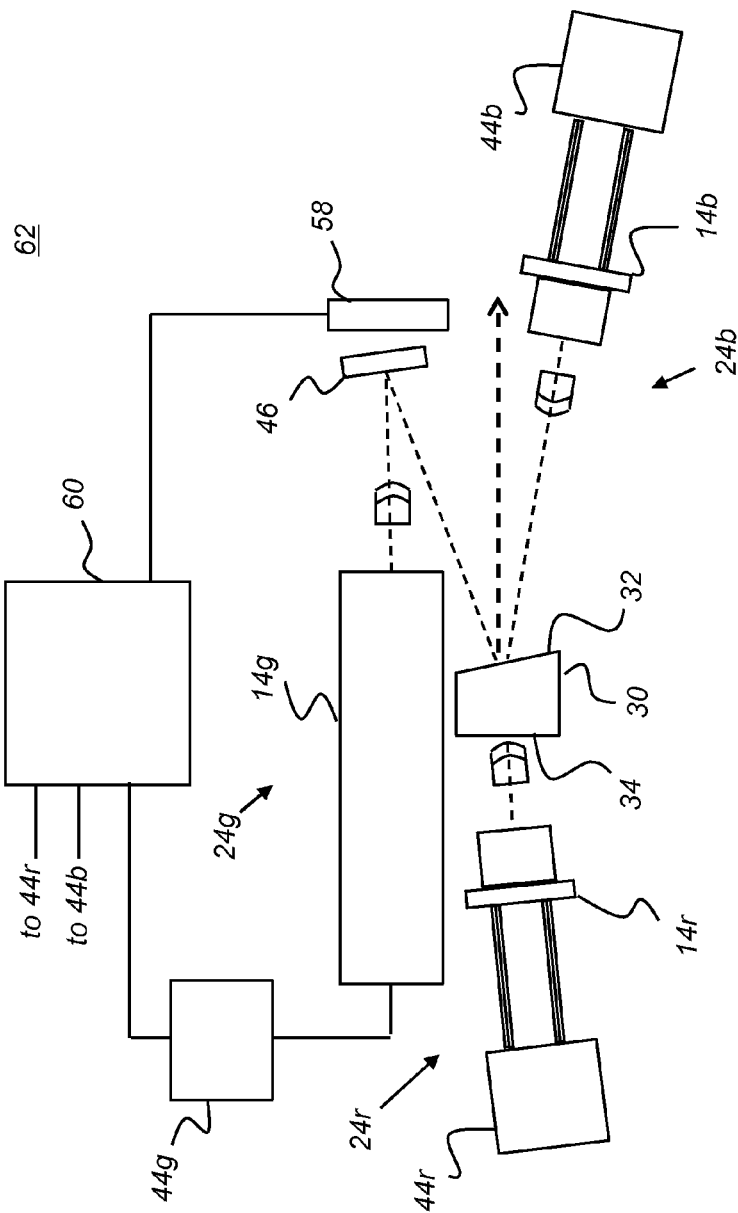
FIG. 13 is a schematic diagram that shows an alternate embodiment of a color combining apparatus having a folded light path in one color channel.

Referring to the schematic of FIG. 13, there is shown an alternate embodiment of a color combining apparatus 62 in which the light path within green color channel 24g is folded using a reflective surface, shown here as a folding mirror 46. Leakage light that transmits through folding mirror 46 is detected by an optional sensor 58, such as a photodiode or other appropriate sensor device, and this detected signal then used as feedback for controlling laser power from solid-state light source 14g. A control logic processor 60, such as a microprocessor, is used for providing image data to each of the lasers and for regulating the output power of green solid-state light source 14g according to the feedback signal.

Control logic processor 60, shown schematically only in the FIG. 13 embodiment, would also be required for obtaining the image data and providing it to drivers 44r, 44g, and 44b for each of the lasers in embodiments that use direct laser modulation for forming pixels, such as shown in FIGS. 4-12.

As can be seen from the FIG. 13 embodiment, different arrangements of dichroic coatings can be used for color combining element 30. In the FIG. 13 embodiment, dichroic surface 32 reflects the green wavelength band and transmits blue and red wavelength bands. Dichroic surface 34 transmits the red wavelength band and reflects at least the blue wavelengths. As noted for embodiments of FIGS. 6-12, the FIG. 13 embodiment allows the use of low incident angles for transmitted and reflected light at each dichroic surface.

Figure 14:
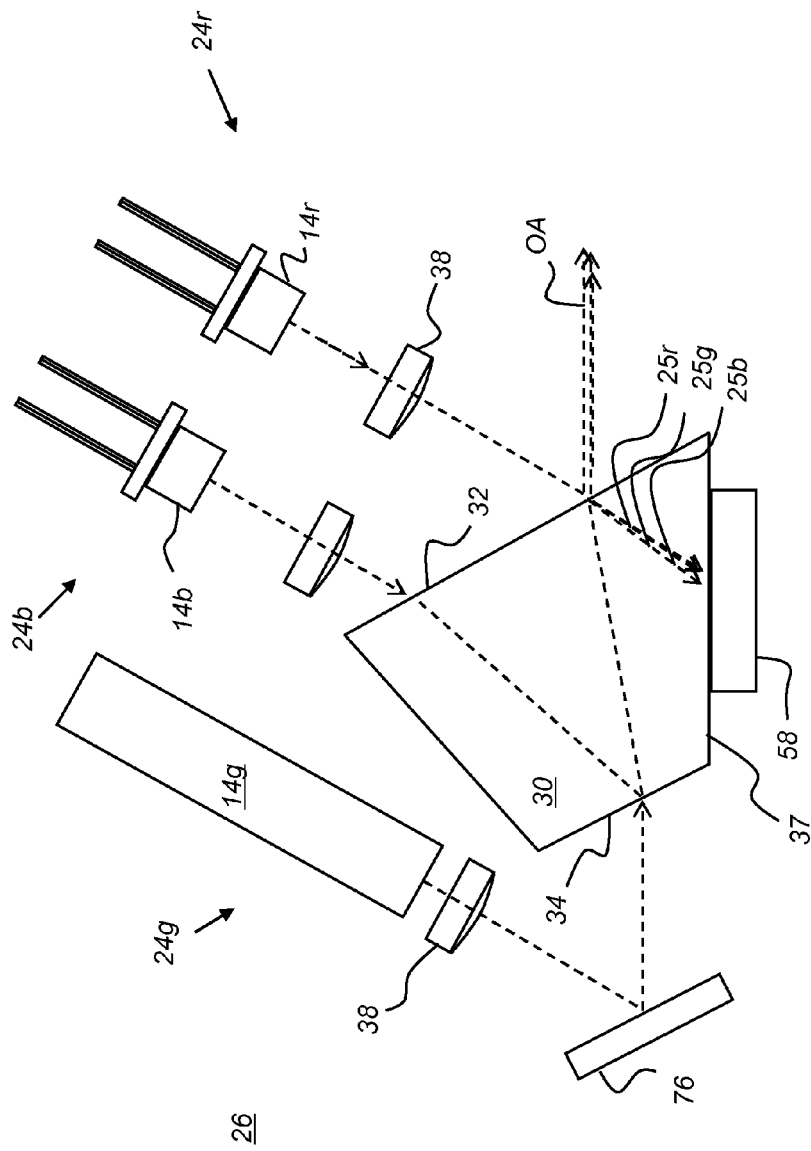
FIG. 14 is a schematic diagram that shows a color combining apparatus according to another alternate embodiment of the present invention and provided with a photosensor.

FIG. 14 is a schematic diagram that shows a color combining apparatus according to another alternate embodiment of the present invention in which power of any of the three light channels 24r, 24g, or 24b can be measured. Sensor 58 is positioned in optical contact against an uncoated surface 37 of color combining element 30 or held in position using an optical adhesive. Each of stray light beams 25r, 25g, and 25b is directed to sensor 58, thereby using misdirected trace light that results from imperfection of dichroic surface 32. Stray light beam 25r is the small fraction of light from light source 14r that is inadvertently transmitted through dichroic surface 32 and not reflected onto optical axis OA from red light source 14r. Stray light beam 25g is the trace light from light source 14g that does not transmit through dichroic surface 32 and onto optical axis OA but is instead reflected. Similarly, stray light beam 25b is the trace light from light source 14b that does not transmit through dichroic surface 32 and onto optical axis OA but is instead reflected. Using such a configuration, power can be measured for each individual color channel as its corresponding light source is energized.

Beam Shape Considerations

Figure 15:
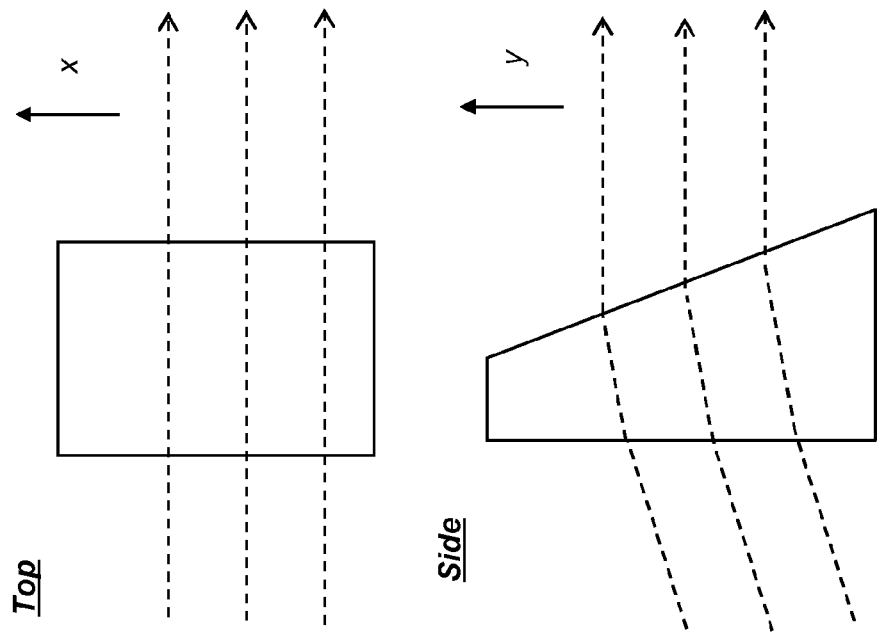
FIG. 15 is a schematic diagram that shows orientation of a laser beam relative to the color combining element for compensating beam anamorphism.
Figure 15:
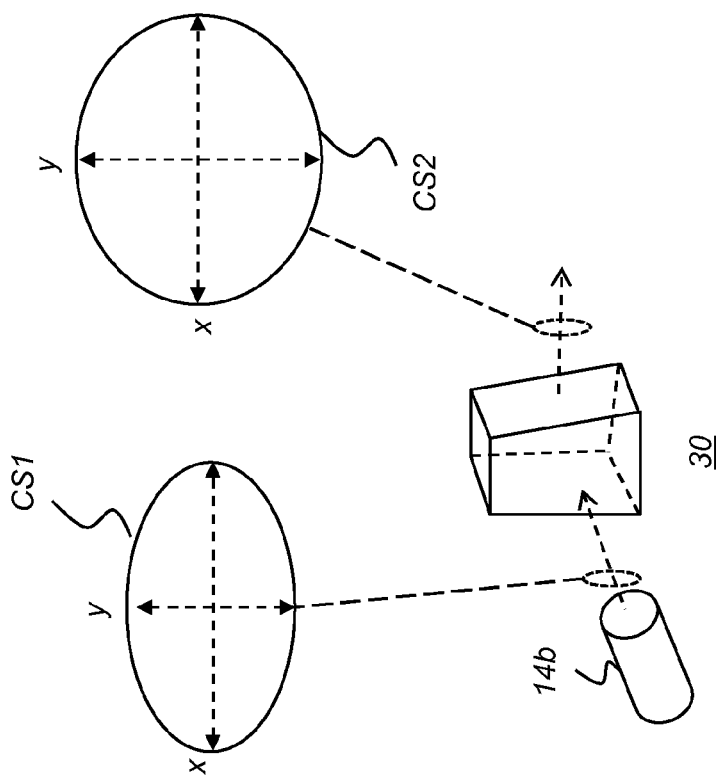

The divergence of solid state lasers is usually anamorphic, longer along one axis than along the orthogonal axis. Considering the arrangement shown in FIG. 9, for example, FIG. 15 shows a cross-sectional view of the elliptical beam profile CS1 as it emerges from blue laser light source 14b, having a low-divergence angle in the y direction (vertical in this example) and a high-divergence angle in the x direction. Preferably, this laser beam is oriented so that its low divergence angle (y direction) lies substantially in the plane of the wedge angle $\beta$ of color combining element 30, vertical in the example shown. Side and top cross-section views of color combining element 30 are shown, with the light beam path represented, exaggerated with respect to height and width dimensions. The vertical or y component of the light beam "sees" the wedge-shaped refractive structure, which correspondingly stretches the beam in the vertical direction. The orthogonal horizontal or x component of the light beam passes through color combining element 30 without encountering additional refraction in this direction, as shown in the top view cross-section. The resulting beam profile CS2 is more symmetrical or circular as a result.

Polarization Considerations

Figure 7:
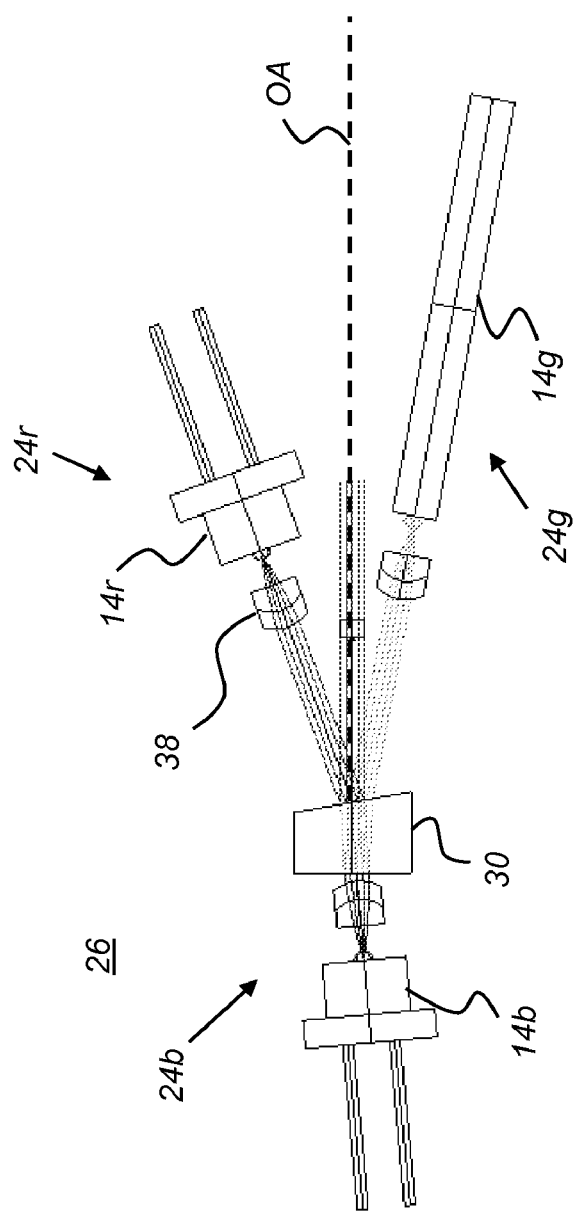
FIG. 7 is a schematic diagram that shows a color combining apparatus according to another alternate embodiment of the present invention.

Typically, dichroic coatings are designed to transmit p-polarized light, having its transmission axis parallel to the plane of incidence, and to reflect orthogonally polarized s-polarized light. This characteristic presents a problem with a color combiner wherein some colors are reflected and others transmitted from the dichroic surfaces. Orthogonal polarization axes are a problem, for example, when illumination is provided to an LCoS device that modulates light by selectively changing the polarization state of individual pixels. In conventional imaging apparatus, a wave plate must be used to correct for this condition. With embodiments of color combining element 30, maintaining low incidence angles at dichroic surfaces, as shown in the embodiments of FIGS. 6 and 7, for example, helps to reduce differences in dichroic response due to polarization.

Fabrication

The solid, transparent block of material used for the substrate of color combining element 30 is selected based on a number of factors, including cost, index of refraction, and suitability for coating. The index of refraction of the material is important as it relates to the incident angles of light from the laser sources. In the embodiment of FIG. 7, for example, the index of refraction of the material is a factor in the angular positioning of blue solid-state light source 14*b* and green solid-state light source 14*g*.

Dichroic surfaces 32 and 34 are flat surfaces. Because light from the light sources is not incident on the other uncoated surfaces of color combining element 30, the other surfaces of this element can be other than flat, such as having some amount of curvature or other shape, which might be useful in packaging or mounting, for example. Ground glass surfaces are acceptable in some embodiments The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, although the description hereinabove is primarily directed to laser diodes, color combining element 30 of the present invention could be utilized with other color light sources, including other laser types and with solid-state light sources that are energizable to emit light of suitable wavelength bands for imaging or other function that requires light combination. Arrays with multiple light emitters could be used. In general, this approach would work best with a source that provides well-collimated light with a narrow beam width. While color combining element 30 is described for mixing illumination that may not be modulated by a spatial light modulator prior to its incidence at this color combiner, such as is shown in the FIG. 12 embodiment, this approach could alternately be used for combining light that has already been modulated in each color channel using a separate modulator array. However, there may be some practical constraints for combining modulated light, other than for light modulated using direct laser modulation as described earlier, since distortion within each color channel would differ significantly. It should also be noted that the exemplary embodiments shown describe red, green, and blue color channels and show particular arrangements of dichroic surfaces that are fabricated to transmit or reflect particular colors. These examples, however, are intended to describe particular embodiments and are non-limiting; other color combinations for dichroic surface behavior could be used, for example, interchanging color designations in various figures and allowing different arrangements of colors reflected or transmitted, or different wavelength bands other than conventional red, green, and blue wavelength bands.

Thus, what is provided is an apparatus and method for combining light of first, second, and third wavelength bands in an imaging apparatus.

The invention claimed is:

1. A color combining apparatus comprising:
a first color channel having a first light source with first beam-conditioning optics and energizable to direct a first beam of light of a first wavelength band directly onto a first coated surface of a color combining element at a first incident angle;
a second color channel having a second light source with second beam-conditioning optics and energizable to direct a second beam of light of a second wavelength band directly onto the first coated surface of the color combining element at a second incident angle;
a third color channel having a third light source with third beam-conditioning optics and energizable to direct a third beam of light of a third wavelength band onto a second coated surface of the color combining element;
wherein the color combining element is a single piece of a solid, transparent material and wherein the first and second flat coated surfaces are noncontiguous;
wherein the first coated surface is treated to reflect incident light of the first wavelength band onto an optical axis and to transmit incident light of the second and third wavelength bands;
wherein the second coated surface is treated to reflect incident light of the second wavelength band and to transmit incident light of the third wavelength band,
and wherein the first and second surfaces lie in substantially parallel planes and wherein the first and second incident angles are equal.

2. The color combining apparatus of claim 1 wherein, with respect to surfaces of the color combining element, the light of the first wavelength band is incident only on the first coated surface, the light of the second wavelength band is incident only on the first and second coated surfaces, and the light of the third wavelength band is incident only on the second and first coated surfaces.

3. The color combining apparatus of claim 1 further comprising a reflective surface disposed to fold the light of the third wavelength band toward the color combining element.

4. The color combining apparatus of claim 3 wherein the reflective surface lies in a plane that is substantially parallel to at least one of the first and second coated surfaces.

5. The color combining apparatus of claim 1 wherein, with respect to the light combining element, the light of the second wavelength band transits the first coated surface twice, at spaced-apart locations.

6. The color combining apparatus of claim 1 wherein the color combining element further directs output light of the second and third wavelength bands along the optical axis.

7. The color combining apparatus of claim 1 wherein the optical axis is oblique to the first coated surface.

8. The color combining apparatus of claim 1 wherein the solid, transparent material is glass or plastic.

9. The color combining apparatus of claim 1 wherein at least one of the first, second, and third color channels comprises a solid-state light source.

10. The color combining apparatus of claim 1 further comprising a light integrator disposed to homogenize received illumination along the optical axis.

11. The color combining apparatus of claim 1 further comprising projection optics disposed to direct the light from the color combining element toward a display surface.

12. The color combining apparatus of claim 1 further comprising a light modulator disposed to receive light along the optical axis from the color combining element.

13. The color combining apparatus of claim 12 wherein the light modulator is taken from the group consisting of a digital micromirror array, a liquid crystal device, and a scanner.

14. The color combining apparatus of claim 1 further comprising a light sensor disposed in optical contact against an uncoated surface of the color combining element.

15. A color combining apparatus comprising:
first, second, and third color channels, each color channel having a light source that is energizable to direct light of a corresponding first, second, or third wavelength band, respectively, toward a color combining element;
wherein the color combining element is a single piece of a solid, transparent material having at least first and second flat coated surfaces that are noncontiguous and that are obliquely disposed with respect to each other at a wedge angle;

the first coated surface treated to reflect incident light of the first wavelength band onto an optical axis and to transmit incident light of the second and third wavelength bands;

the second coated surface treated to reflect incident light of the second wavelength band and to transmit incident light of the third wavelength band and wherein an angle of incidence for light of at least one of the first, second, and third wavelength bands is less than the wedge angle.

16. A color combining apparatus comprising:

a first color channel having a first light source with first beam-conditioning optics and energizable to direct a first beam of light of a first wavelength band directly onto a first coated surface of a color combining element at a first incident angle;

a second color channel having a second light source with second beam-conditioning optics and energizable to direct a second beam of light of a second wavelength band directly onto the first coated surface of the color combining element at a second incident angle;

a third color channel having a third light source with third beam-conditioning optics and energizable to direct a third beam of light of a third wavelength band onto a second coated surface of the color combining element;

wherein the light beams originating from the first, second, and third color channels are substantially in parallel;

wherein the color combining element is a single piece of a solid, transparent material having at least first and second flat coated surfaces that are noncontiguous and that lie in substantially parallel planes;

the first coated surface treated to reflect incident light of the first wavelength band onto an optical axis and to transmit incident light of the second and third wavelength bands;

the second coated surface treated to reflect incident light of the second wavelength band and to transmit incident light of the third wavelength band; and a reflective surface in the path of the light beam from the third color channel, the reflective surface spaced apart from the color combining element and substantially parallel to the second coated surface and disposed to reflect the light beam from the third color channel toward the color combining element.

17. An imaging apparatus comprising:

a first color channel having a first light source with first beam-conditioning optics and energizable to direct a first beam of light of a first wavelength band directly onto a first coated surface of a color combining element at a first incident angle;

a second color channel having a second light source with second beam-conditioning optics and energizable to direct a second beam of light of a second wavelength band directly onto the first coated surface of the color combining element at a second incident angle;

a third color channel having a third light source with third beam-conditioning optics and energizable to direct a third beam of light of a third wavelength band onto a second coated surface of the color combining element;

wherein the color combining element is a single piece of a solid, transparent material having at least first and second coated surfaces that are noncontiguous and that lie in substantially parallel planes;

the first coated surface treated to reflect incident light of the first wavelength band along an optical axis as illumination and to transmit incident light of the second and third wavelength bands;

the second coated surface treated to reflect incident light of the second wavelength band and to transmit incident light of the third wavelength band;

a light modulator disposed to receive illumination along the optical axis and actuable to form modulated light from illumination in each of the first, second, and third wavelength bands; and projection optics disposed to direct the modulated light toward a display surface.

18. An imaging apparatus comprising:

a first color channel having a first light source with first beam-conditioning optics and energizable to direct a first beam of light of a first wavelength band directly onto a first coated surface of a color combining element at a first incident angle;

a second color channel having a second light source with second beam-conditioning optics and energizable to direct a second beam of light of a second wavelength band directly onto the first coated surface of the color combining element at a second incident angle;

a third color channel having a third light source with third beam-conditioning optics and energizable to direct a third beam of light of a third wavelength band onto a second coated surface of the color combining element;

wherein the color combining element is a single piece of a solid, transparent material having at least first and second coated surfaces that are noncontiguous;

the first coated surface treated to reflect incident light of the first wavelength band along an optical axis as illumination and to transmit incident light of the second and third wavelength bands;

the second coated surface treated to reflect incident light of the second wavelength band and to transmit incident light of the third wavelength band wherein the first and second coated surfaces lie in substantially parallel planes;

and a scanner disposed to receive illumination of the first, second, and third wavelength bands along the optical axis and actuable to scan the received illumination toward a display surface.

19. The color combining apparatus of claim 15 wherein, with respect to surfaces of the color combining element, the light of the first wavelength band is incident only on the first coated surface, the light of the second wavelength band is incident only on the first and second coated surfaces, and the light of the third wavelength band is incident only on the second and first coated surfaces.

20. The color combining apparatus of claim 15 further comprising a reflective surface disposed to fold the light of the third wavelength band toward the color combining element.

21. The color combining apparatus of claim 15 wherein incident light from the third color channel is at an oblique angle with respect to the optical axis.

22. The color combining apparatus of claim 15 wherein the color combining element further directs output light of the second and third wavelength bands along the optical axis.

23. The color combining apparatus of claim 15 wherein the optical axis is oblique to the first coated surface.

24. The color combining apparatus of claim 15 wherein the solid, transparent material is glass or plastic.

25. The color combining apparatus of claim 15 wherein at least one of the first, second, and third color channels comprises a solid-state light source.

26. The color combining apparatus of claim 15 further comprising a light integrator disposed to homogenize received illumination along the optical axis.

27. The color combining apparatus of claim 15 further comprising projection optics disposed to direct the light from the color combining element toward a display surface.

28. The color combining apparatus of claim 15 further comprising a light modulator disposed to receive light along the optical axis from the color combining element.

29. The color combining apparatus of claim 28 wherein the light modulator is taken from the group consisting of a digital micromirror array, a liquid crystal device, and a scanner.

30. The color combining apparatus of claim 15 further comprising a light sensor disposed in optical contact against an uncoated surface of the color combining element.

* * * * *